(12) United States Patent
So et al.

(10) Patent No.: US 7,850,045 B2
(45) Date of Patent: Dec. 14, 2010

(54) DISPENSER FOR FLOWABLE MATERIAL

(75) Inventors: Kwok Kuen So, 2nd Floor, Chuan Yuan Factory Building, 342-344 Kwun Tong Road, Kwun Tong, Kowloon, Hong Kong SAR (CN); Yiu Chung Wan, Hong Kong SAR (CN)

(73) Assignee: Kwok Kuen So, Kowloon, Hong Kong SAR (CN)

( * ) Notice: Subject to any disclaimer, the term of this patent is extended or adjusted under 35 U.S.C. 154(b) by 545 days.

(21) Appl. No.: 11/949,964

(22) Filed: Dec. 4, 2007

(65) Prior Publication Data

US 2009/0120959 A1 May 14, 2009

(30) Foreign Application Priority Data

Nov. 12, 2007 (HK) ................................ 07112370.8

(51) Int. Cl.
 *B67D 7/78* (2010.01)
(52) U.S. Cl. .................. 222/132; 604/227; 222/467; 366/76.7
(58) Field of Classification Search .................. 222/132, 222/144.5, 386, 391, 616, 469, 384, 467; 604/221, 224, 227, 228; 366/76.7, 90, 324
See application file for complete search history.

(56) References Cited

U.S. PATENT DOCUMENTS

| | | | | |
|---|---|---|---|---|
| 2,632,445 | A * | 3/1953 | Kas, Sr. ....................... | 604/209 |
| 3,340,872 | A * | 9/1967 | Cox ............................ | 604/229 |
| 3,388,941 | A * | 6/1968 | Marcus ........................ | 294/1.1 |
| 4,263,911 | A * | 4/1981 | McCormack et al. ........ | 604/227 |
| 4,925,449 | A * | 5/1990 | Saez et al. ................... | 604/227 |
| 5,246,011 | A * | 9/1993 | Caillouette .................. | 600/566 |
| 5,709,320 | A * | 1/1998 | Jimenez ....................... | 222/175 |
| 6,817,749 | B2 * | 11/2004 | Saunders et al. ............ | 366/76.7 |
| 7,037,094 | B1 * | 5/2006 | Lee .............................. | 425/12 |
| 2006/0249223 | A1 * | 11/2006 | Leer et al. ..................... | 141/18 |

* cited by examiner

*Primary Examiner*—Lien T Ngo
(74) *Attorney, Agent, or Firm*—Leydig, Voit & Mayer, Ltd.

(57) ABSTRACT

A dispenser for flowable material includes a cylinder, a piston in and slidable along the cylinder for pressing and thus dispensing flowable material contained in the cylinder, and a shaft extending into the cylinder for sliding the piston. The shaft incorporates a thumb piece for engagement by the thumb of a user to drive the shaft in a forward direction into the cylinder for sliding the piston to dispense flowable material. The thumb piece is slidable along the shaft. A unidirectional clutch between the thumb piece and the shaft is operable in the forward direction to fix the thumb piece to the shaft such that the shaft may be driven forward by the thumb piece and is inoperable in an opposite, rearward, direction to release the thumb piece from the shaft such that the thumb piece can slide rearward along the shaft for operation at another position.

16 Claims, 7 Drawing Sheets

DISPENSER FOR FLOWABLE MATERIAL

The present invention relates to a dispenser of the piston-in-cylinder type, for dispensing flowable material and particularly, but not exclusively, food material such as icing or frosting.

BACKGROUND OF INVENTION

Dispensers of the piston-in-cylinder type for flowable material such as icing or frosting are widely used, but those larger models that can hold more icing are not designed for one-hand operation because of the extended length of the piston-driving shaft.

The invention seeks to obviate or at least alleviate such a problem or shortcoming by providing a new or otherwise improved dispenser for flowable material.

SUMMARY OF THE INVENTION

According to the invention, there is provided a dispenser for flowable material, comprising:
  an elongate housing for containing flowable material, the housing having an end including an outlet through which flowable material in the housing may be dispensed;
  a piston in and slidable along the housing for pressing and thus dispensing flowable material in the housing; and
  a shaft extending into the housing for sliding the piston, the shaft incorporating a thumb piece outside the housing for engagement by the thumb of a user to drive the shaft in a forward direction into the housing for sliding the piston to dispense flowable material in the housing;
  wherein the thumb piece is slidable along the shaft; and a unidirectional clutch is provided between the thumb piece and the shaft, the clutch being operable in the forward direction to fix the thumb piece to the shaft such that the shaft may be driven forward by the thumb piece and being inoperable in an opposite rearward direction to release the thumb piece from the shaft such that the thumb piece may be slid rearward along the shaft for operation at a posterior position.

Preferably, the thumb piece has front and rear portions between which the thumb of said user may engage to move the thumb piece in opposite directions forward and rearward.

More preferably, the thumb piece has an aperture defined by its front and rear portions, in which the thumb of said user may engage.

Further more preferably, the thumb piece comprises a loop providing the aperture.

In a preferred embodiment, the clutch is pivotable about the shaft between an operating position gripping the shaft and an inoperative position releasing the shaft.

More preferably, the clutch has two parts disposed on opposite sides of the shaft for gripping the shaft.

Further more preferably, the clutch comprises a loop surrounding the shaft, having opposite portions providing the two parts.

It is preferred that the clutch is resiliently biased to pivot towards its operating position.

It is preferred that the thumb piece is pivotable about the shaft in the forward direction to pivot the clutch into its operating position and in the rearward direction to pivot the clutch into its inoperative position.

It is further preferred that the thumb piece is provided on one side of the shaft.

It is further preferred that the thumb piece is resiliently biased to pivot in the forward direction.

It is further preferred that the thumb piece and the clutch are fixed together for simultaneous pivotal movement.

It is yet further preferred that the thumb piece includes a base which surrounds the shaft and with which the clutch is fixed.

It is yet further preferred that the dispenser includes a shell which encloses the base and the clutch and is slidable steadily along the shaft to provide support for the thumb piece, with which the base is pivotably connected.

In a preferred embodiment, the other end of the housing opposite the outlet includes a formation for holding by the index and middle fingers of said user, with the thumb engaging the thumb piece, such that the dispenser can be held and used by one hand of said user.

More preferably, the housing includes a lid at its other end, through which the shaft extends and on which the formation is provided.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figures 1, 2:
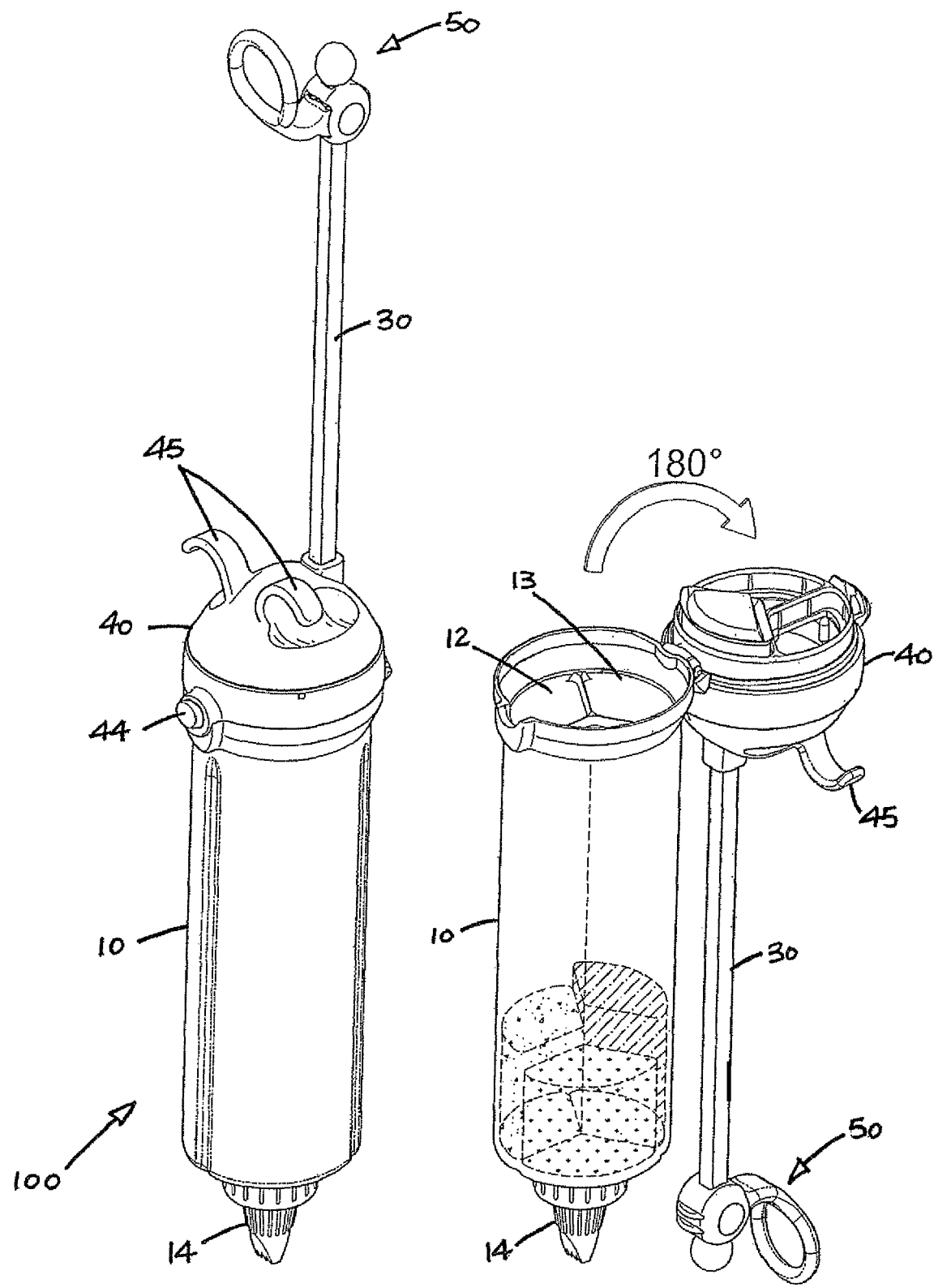
FIG. 1 is a front perspective view of a first embodiment of a dispenser for flowable material in accordance with the invention.
FIG. 2 is a front perspective view similar to FIG. 1, showing a lid of the dispenser opened.
Figures 3, 4:
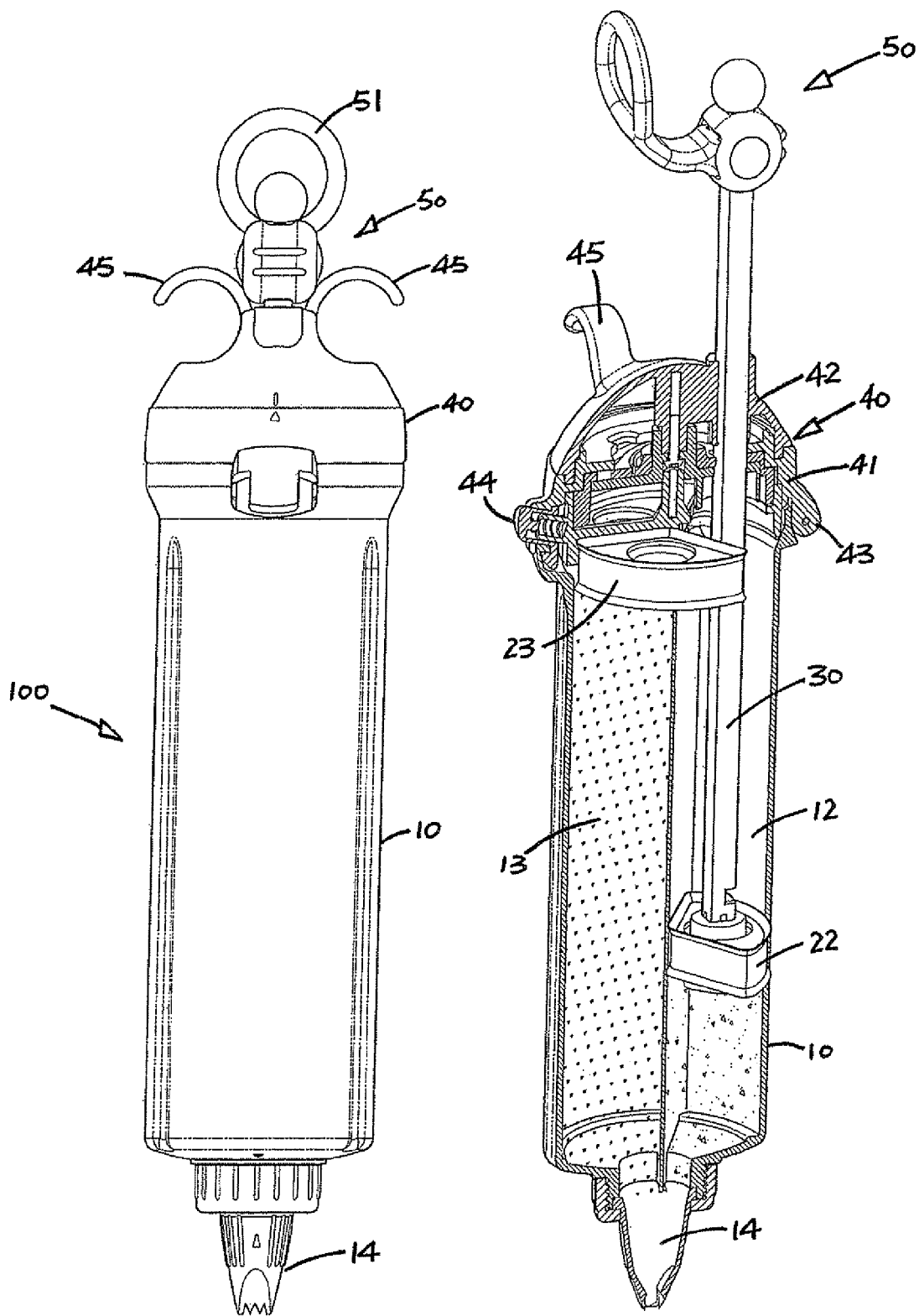
FIG. 3 is a rear view of the dispenser of FIG. 1.
FIG. 4 is a sectioned perspective view of the dispenser of FIG. 1, showing its internal construction.
Figure 5:
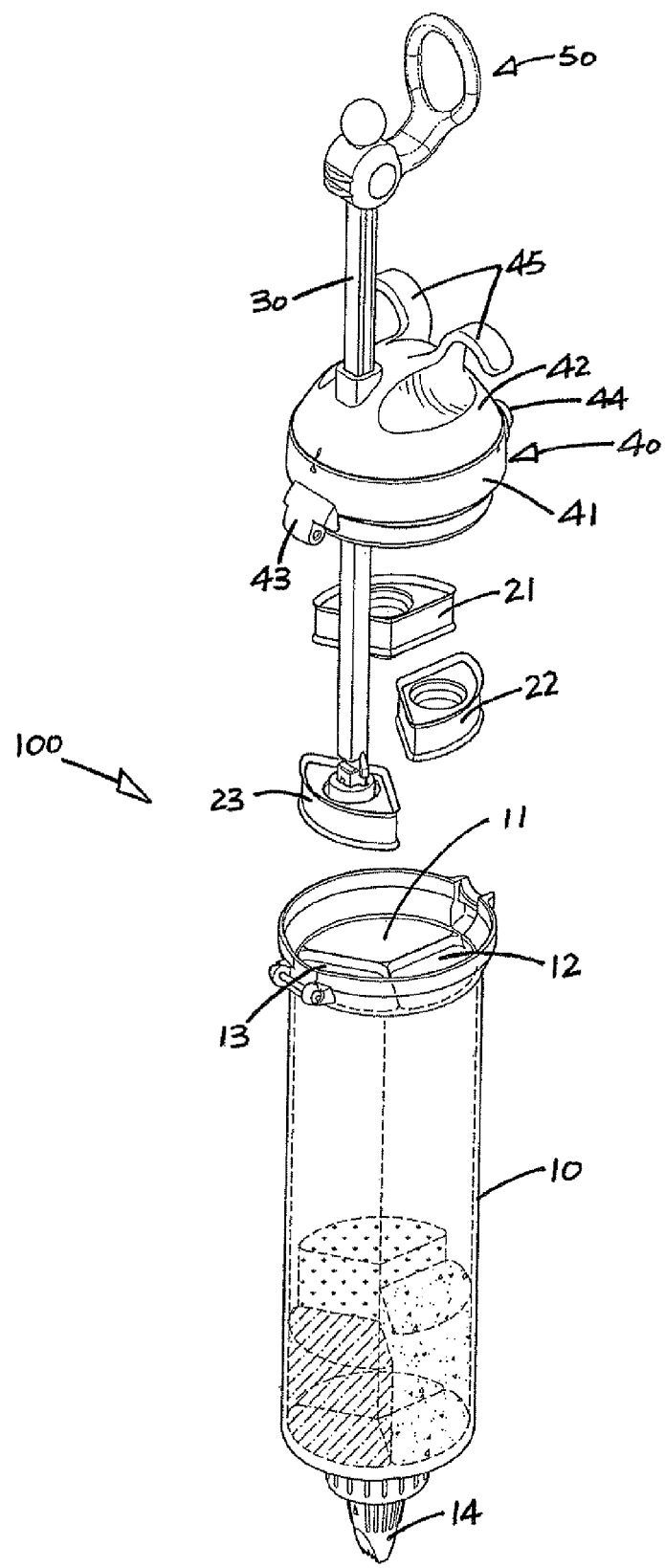
FIG. 5 is an exploded perspective view of the dispenser of FIG. 1.

Reference is initially made to FIGS. 1 to 5 of the drawings, which show a first dispenser 100 for flowable material, such as whipped cream for making cakes, embodying the invention. The dispenser 100 has a body in the form of an elongate transparent plastic cylinder 10 which is partitioned into three identical longitudinally extending chambers 11/12/13 about the cylinder's central axis for containing whipped creams of different colors, a plastic piston 21/22/23 in and slidable along each of the chambers 11/12/13, and a single plastic shaft 30 for selectively sliding the pistons 21/22/23.

The cylinder 10 has, projecting centrally from its lower end, a pointed outlet 14 which is in communication with the three chambers 11/12/13 and through which the creams in the chambers 11/12/13 may selectively be dispensed by means of the corresponding pistons 21/22/23 pressing upon them from behind.

The cylinder 10 is closed at its upper end by means of a hinged plastic lid 40. The shaft 30 extends through the lid 40, at an eccentric position thereof, into the cylinder 10. The lid 40 is formed by a base part 21 which is hinged at 43 to the cylinder 10 on the rear side such that it cannot be turned, and a top part 42 which is rotatable relative to the base part 41 about the cylinder's central axis so as to turn the shaft 30 to any one of the chambers 11/12/13 for operation.

The lower end of the shaft 30 and the pistons 21/22/23 are designed to be inter-engageable such that any one of the pistons 21/22/23 to which the shaft 30 has been turned may be coupled with the shaft 30, upon slight pressing in of the latter's lower end. Upon coupling, that piston 21/22/23 may then be driven by the shaft 30 to dispense the cream in the relevant chamber 11/12/13.

To dispense another cream, the shaft 30 should be withdrawn to disconnect from the present piston 21/22/23, and the lid 40 may then be turned to align the shaft 30 with another appropriate piston 21/22/23. Upon the shaft 30 being fully withdrawn, the lid 40 is unlocked through a certain mechanism and then a latch button 44 can be depressed to open the lid 40 for the cylinder 10 to be refilled with creams or emptied for cleaning.

Figures 9, 10:
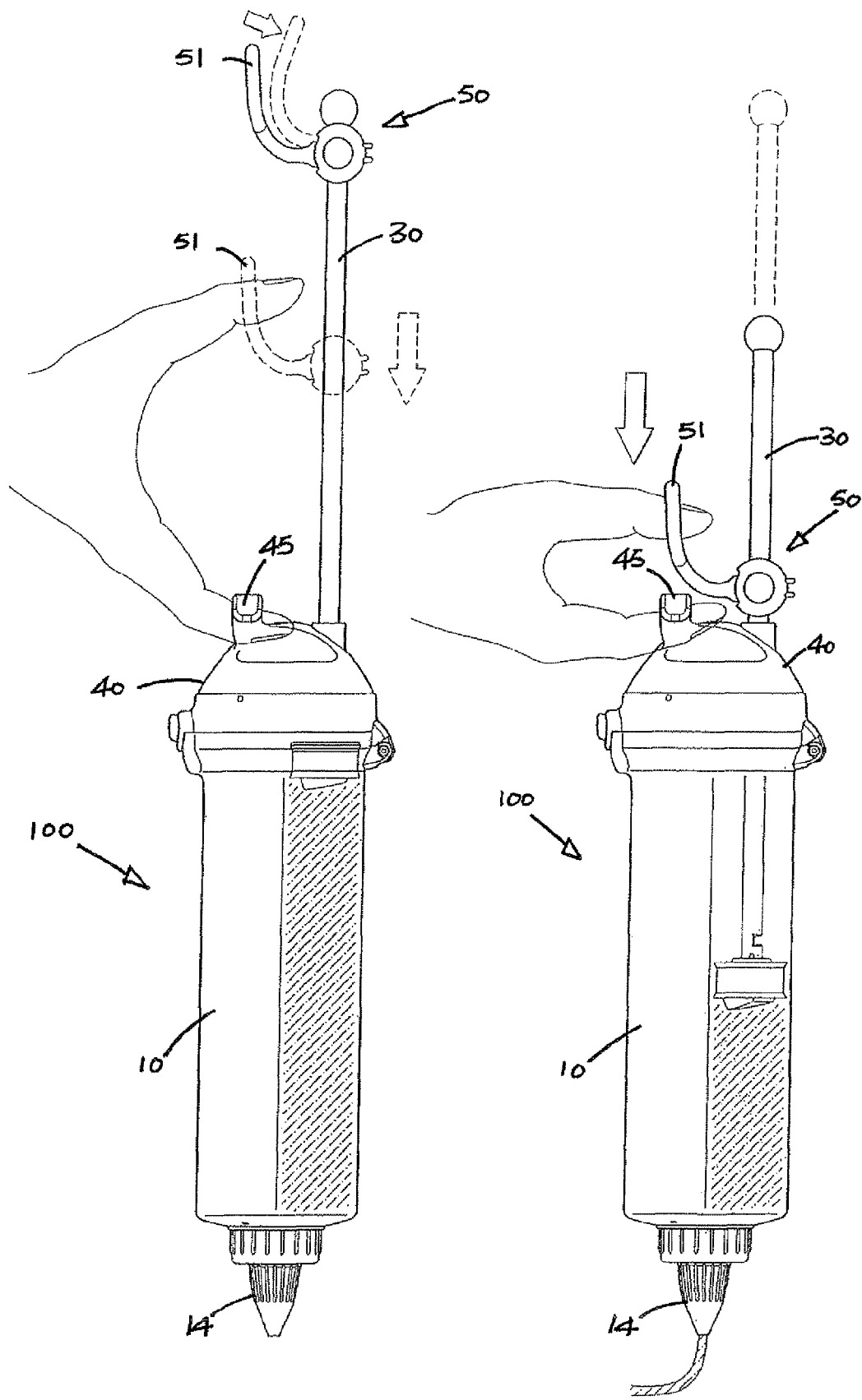
FIG. 9 is a side view of the dispenser of FIG. 1, showing the shaft being pushed by means of the thumb piece initially into the dispenser.
FIG. 10 is a side view similar to FIG. 9, showing the shaft being pushed by means of the thumb piece partially into the dispenser.

The shaft 30 incorporates a plastic thumb piece 50 outside the cylinder 10 for engagement by the thumb of a user (as shown in FIG. 9 for example) to drive the shaft 30 forward into the cylinder 10 to slide the relevant piston 21/22/23 for cream dispensing.

The lid 40 includes, integrally on its top part 42, a formation provided by a pair of hooks 45 facing back-to-back for holding by the index and middle fingers of the user (see FIG. 9 again), with the thumb engaging the thumb piece 50, such that the dispenser 100 can be held and used by one hand of the user.

Figure 6:
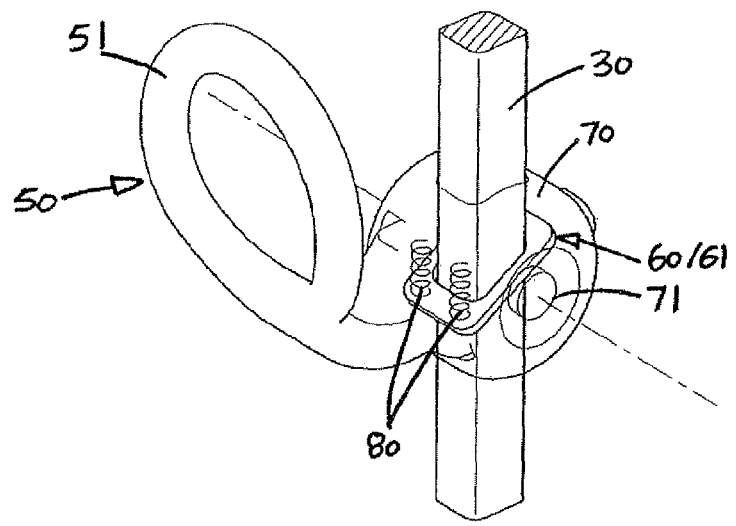
FIG. 6 is a partial perspective view of the dispenser of FIG. 1, showing a shaft of the dispenser and a thumb piece on the shaft.
Figures 7, 8:
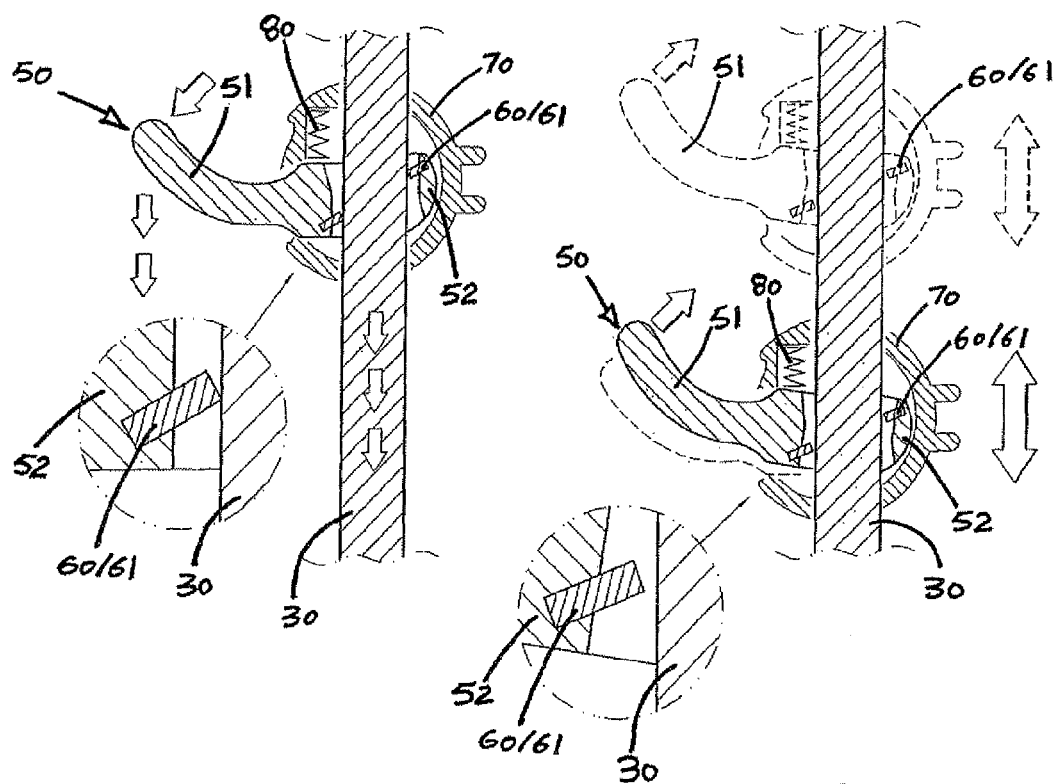
FIG. 7 is a cross-sectional side view of the shaft and thumb piece of FIG. 6, showing how the thumb piece engages with upon the shaft for pushing the shaft into the dispenser.
FIG. 8 is a cross-sectional side view of the shaft and thumb piece of FIG. 7, showing how the thumb piece disengages from the shaft for sliding along the shaft.

Referring now to FIGS. 6 to 8, the thumb piece 50 is slidable in opposite directions along the shaft 30, and a unidirectional or one-way clutch 60 is provided between the thumb piece 50 and the shaft 30.

The thumb piece 50 has a ring 51 providing an aperture in which the thumb of the user may engage for using the thumb piece 50, and includes a base 52 that surrounds the shaft 30 for support. More specifically, the thumb ring 51 is provided on one, front side of the shaft 30, and it has lower and upper portions (defining said aperture) between which the thumb engages to move the thumb piece 50 in opposite directions forward (towards the cylinder 10) and rearward (away from the cylinder 10).

A plastic shell 70 is slidable steadily along the shaft 30, and it encloses the base 52 of the thumb piece 50 and provides support for the thumb piece 50. The base 52 is pivotably connected with the shell 70 by a pair of hinge pins 71 on opposite sides, such that the thumb piece 50 is pivotable slightly forward and rearward about the shell 70 and the shaft 30.

The clutch 60 is in the form of a slightly oblong rectangular metal loop 61 surrounding the shaft 30, which has opposite shorter sides providing two parts disposed on opposite front and rear sides of the shaft 30 for gripping the shaft 30 when the loop 61 is sufficiently inclined to the shaft 30. The use of two parts (of the loop 61) gripping the shaft 30 enhances the holding force of the clutch 60 upon the shaft 30.

In general, the clutch loop 61 is slightly pivotable about the shaft 30 between an operating position gripping the shaft 30 (FIG. 7) and an inoperative position releasing the shaft 30 (FIG. 8).

The clutch loop 61 is fixed concentrically within the base 52 of the thumb piece 50 for simultaneous pivotal movement, both surrounding the shaft 30 and being concealed within the shell 70. The loop 61 is pivoted by the thumb piece 50 during use.

The clutch 60 is operable upon pivoting in the forward (downward) direction to fix the thumb piece 50 to the shaft 30 such that the shaft 30 may be driven forward by the thumb piece 50. The clutch 60 is, however, inoperable in the opposite rearward (upward) direction to release the thumb piece 50 from the shaft 30 such that the thumb piece 50 may be slid back along the shaft 30 for operation at a posterior (upper) position.

Inside the shell 70, a pair of small coil springs 80 compressed between the shell 70 and the base 52 resiliently biases the thumb piece 50 and clutch loop 61 downward as shown, whereby the clutch 60 normally grips upon the shaft 30 and the thumb piece 50 stays in position.

Reference is also made to FIGS. 9 to 12, which show how the thumb piece 50, incorporating the clutch 60, is used along the shaft 30.

In FIG. 9, with the thumb piece 50 being situated at about mid-length on the shaft 30 while the shaft 30 is (fully) withdrawn, the user holds the cylinder 10 by his/her index and middle fingers engaging the hooks 45 and slides the shaft 30 into the cylinder 30 (for cream dispensing) by his/her thumb engaging and drawing the ring 51 close.

The thumb piece 50 will remain fixed with the shaft 30 because the ring 51 will tend to pivot downward as it is being pushed downwards, thereby bearing the clutch loop 61 harder against the shaft 30. The grip of the loop 61 upon the shaft 30 can only be strengthened as thumb piece 50 is pushed downwards.

In FIG. 10, the shaft 30 stops as the thumb piece 50 reaches the lid 40.

To continue cream dispensing, the user should first re-extend his/her thumb to move the thumb piece 50 (upwards) off the lid 40. As soon as the thumb piece 50 is reversed and moved in the opposite direction i.e. upwards, the ring 51 will first pivot upwards and take the clutch loop 61 off the shaft 30, whereupon the thumb piece 50 is set free and slides up the shaft 30, as shown in FIG. 11.

Figures 11, 12:
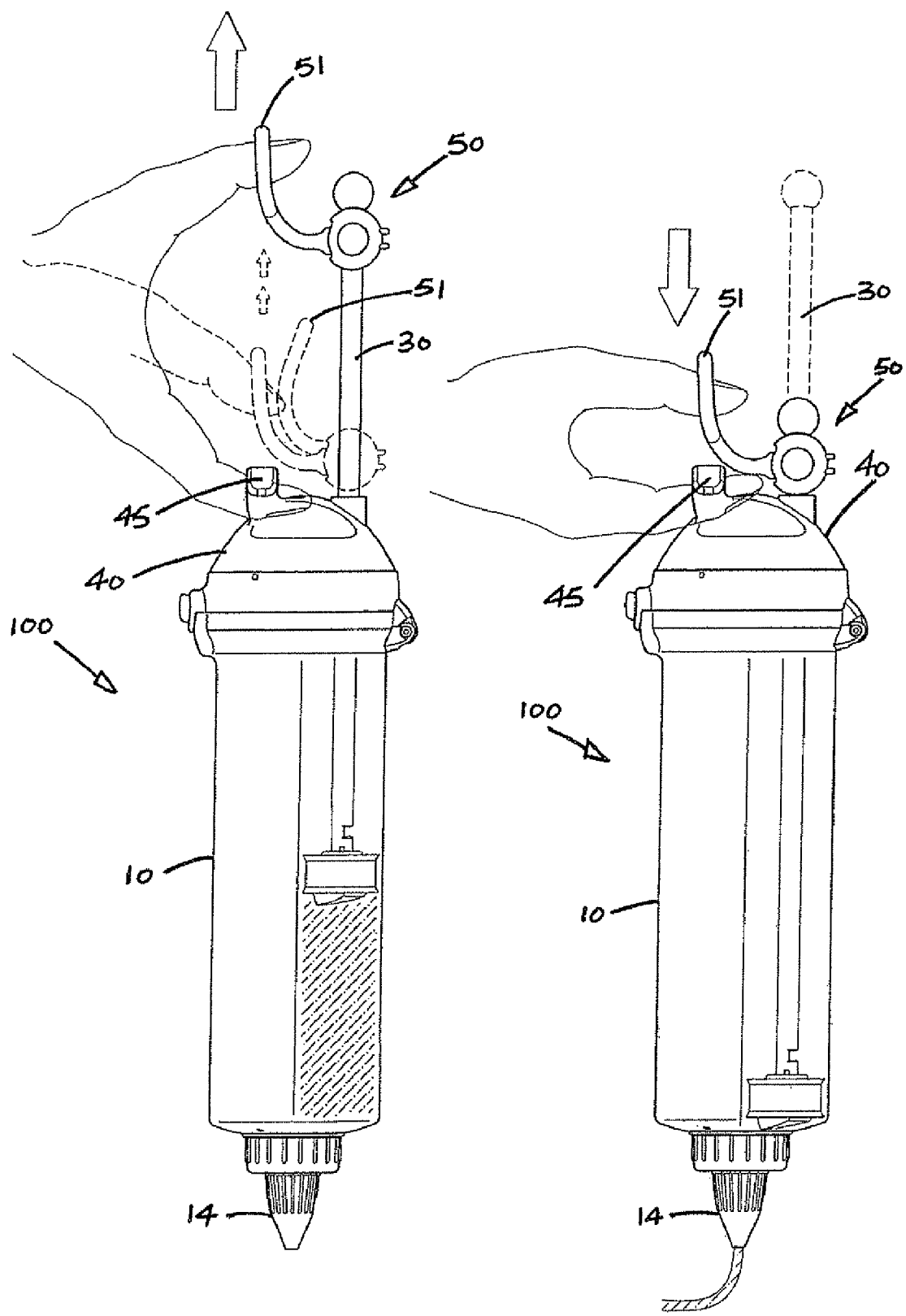
FIG. 11 is a side view similar to FIG. 10, showing the thumb piece being slid along the shaft to a posterior position.
FIG. 12 is a side view similar to FIG. 11, showing the shaft being pushed by means of the repositioned thumb piece fully into the dispenser.

After the thumb piece 50 has reached the top of the shaft 30, the user may then slide it down again (by his/her thumb engaging and drawing the ring 51 close) to push the shaft 30 further into the cylinder 30 so as to dispense more cream, as shown in FIG. 12. The shaft 30 will stop as the thumb piece 50 hits the lid 40 again.

To continue the operation, the user should re-extend the shaft 30 so that it can drive the relevant piston again.

The subject invention is especially suitable for use in flowable material dispensers of the piston-in-cylinder type, which has a relatively long cylinder and hence a relatively long piston-driving shaft that is otherwise too long for operation by one hand of a user to complete a full stroke.

Figure 13:
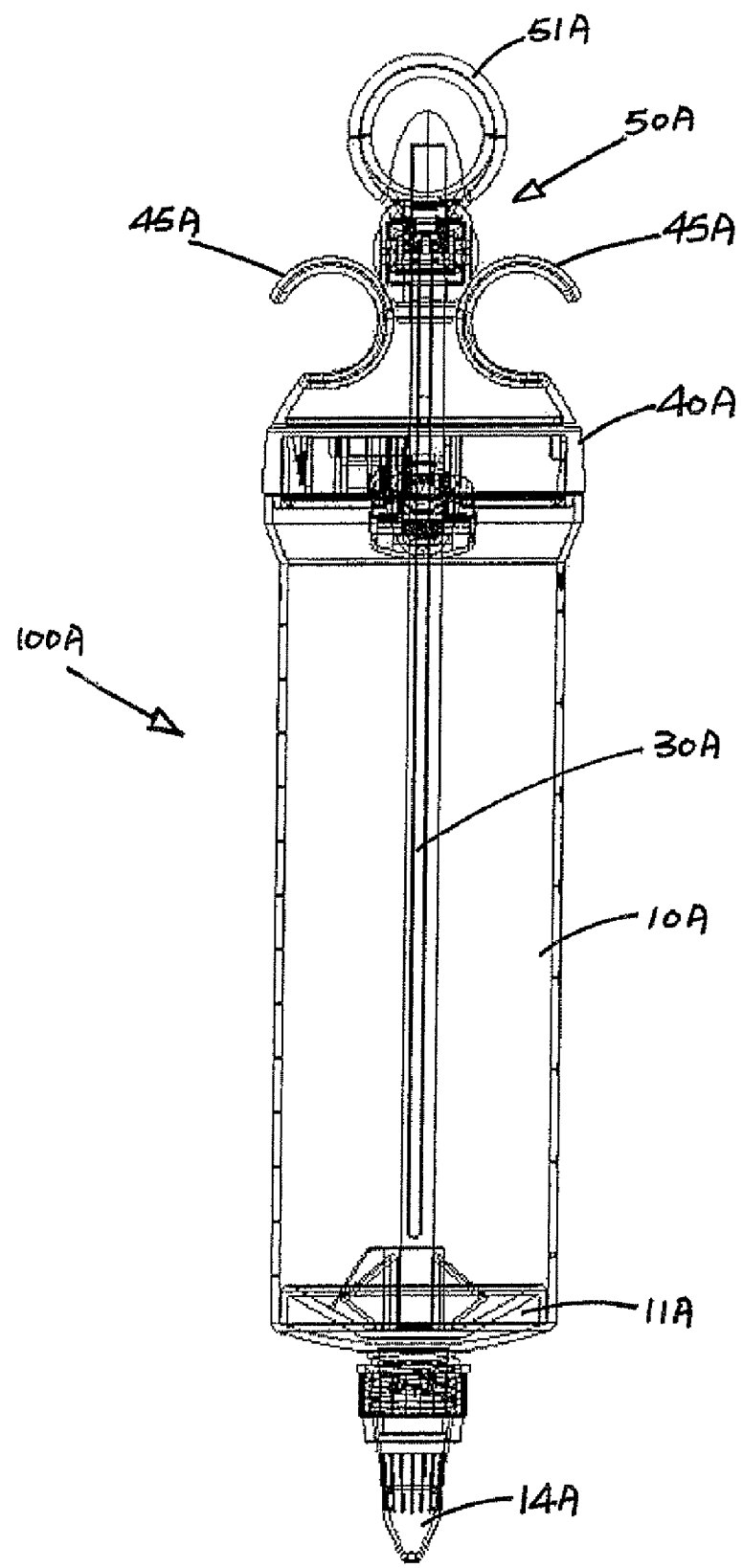
FIG. 13 is a rear view similar to FIG. 3 of a second embodiment of a dispenser for flowable material in accordance with the invention.

Reference is finally made to FIG. 13 of the drawings, which shows a second dispenser 100A for flowable material embodying the invention. This dispenser 100A has the same general construction as the first dispenser 100, with equivalent parts designated by the same reference numerals suffixed by a letter "A". The only major difference in general lies in the cylinder 10A, in that the cylinder 10A is not partitioned and it provides only a single chamber for containing one type of cream or the like. Thus, both the interior of the cylinder 10A and the exterior of the piston 11A have a circular cross-section of the same diameter.

It is envisaged that the unidirectional clutch (60) may take any other suitable form, such as a sprag clutch or a ratchet formed by a rack and a pawl.

As an improvement,

The invention has been given by way of example only, and various other modifications of and/or alterations to the described embodiment may be made by persons skilled in the art without departing from the scope of the invention as specified in the appended claims.

The invention claimed is:

1. A dispenser for flowable material, comprising:
   an elongate housing for containing a flowable material, the housing having a first end including an outlet through which the flowable material in the housing may be dispensed;
   a piston in and slidable along the housing for pressing and thus dispensing the flowable material in the housing;
   a shaft extending into the housing for sliding the piston, the shaft incorporating a thumb piece outside the housing for engagement by a user's thumb to drive the shaft in a forward direction into the housing for sliding the piston to dispense the flowable material in the housing, wherein the thumb piece is slidable along the shaft; and
   a unidirectional clutch located between the thumb piece and the shaft, the clutch being operable in the forward direction to fix the thumb piece to the shaft such that the shaft may be driven forward by the thumb piece and being inoperable in an opposite, rearward, direction and releasing the thumb piece from the shaft such that the thumb piece may slide rearward along the shaft for operation at another position.

2. The dispenser as claimed in claim 1, wherein the thumb piece has front and rear portions between which the thumb of the user may engaged and move the thumb piece in opposite directions, forward and rearward.

3. The dispenser as claimed in claim 2, wherein the thumb piece has an aperture defined by front and rear portions, which the thumb of the user may engage.

4. The dispenser as claimed in claim 3, wherein the thumb piece comprises a loop including the aperture.

5. The dispenser as claimed in claim 1, wherein the clutch is pivotable about the shaft between an operating position gripping the shaft and an inoperative position releasing the shaft.

6. The dispenser as claimed in claim 5, wherein the clutch has two parts disposed on opposite sides of the shaft for gripping the shaft.

7. The dispenser as claimed in claim 6, wherein the clutch comprises a loop surrounding the shaft, having opposite portions as the two parts.

8. The dispenser as claimed in claim 5, wherein the clutch is resiliently biased to pivot towards the operating position.

9. The dispenser as claimed in claim 5, wherein the thumb piece is pivotable about the shaft in the forward direction to pivot the clutch into the operating position and in the rearward direction to pivot the clutch into the inoperative position.

10. The dispenser as claimed in claim 9, wherein the thumb piece is located on one side of the shaft.

11. The dispenser as claimed in claim 9, wherein the thumb piece is resiliently biased to pivot in the forward direction.

12. The dispenser as claimed in claim 9, wherein the thumb piece and the clutch are fixed together for simultaneous pivotal movement.

13. The dispenser as claimed in claim 12, wherein the thumb piece includes a base which surrounds the shaft and to which the clutch is fixed.

14. The dispenser as claimed in claim 13, including a shell which encloses the base and the clutch and is slidable along the shaft to support the thumb piece, and with which the base is pivotably connected.

15. The dispenser as claimed in claim 1, wherein a second end of the housing, opposite the outlet, includes a formation for holding by index and middle fingers of the user, with the thumb engaging the thumb piece, such that the dispenser can be held and operated by a single hand of the user.

16. The dispenser as claimed in claim 15, wherein the housing includes a lid at the second end, through which the shaft extends and on which the formation is located.

\* \* \* \* \*